United States Patent [19]

Hoover

[11] Patent Number: 5,095,852
[45] Date of Patent: Mar. 17, 1992

[54] ELEVATOR/STAIRCASE TOY FOR SMALL ANIMALS

[76] Inventor: Judith L. Hoover, 3108 Killian Rd., Uniontown, Ohio 44685

[21] Appl. No.: 682,881

[22] Filed: Apr. 8, 1991

Related U.S. Application Data

[63] Continuation-in-part of Ser. No. 460,992, Jan. 4, 1990, abandoned.

[51] Int. Cl.$^5$ .................. A01K 15/00; A01K 1/00
[52] U.S. Cl. ................................................ 119/29
[58] Field of Search .................. 119/29, 15; 273/113, 273/153 R; 272/6; 446/476, 477, 479, 423

[56] References Cited

U.S. PATENT DOCUMENTS

| | | | |
|---|---|---|---|
| 802,198 | 10/1905 | Corley | 272/6 |
| 1,231,075 | 6/1917 | Seeberger | 272/6 |
| 1,801,724 | 4/1931 | Conklin | 446/476 |
| 2,522,133 | 9/1950 | Sanders | 446/171 |
| 2,908,498 | 10/1959 | Becraft | 272/6 |
| 3,516,399 | 6/1970 | Meyer | 119/29 |
| 3,593,454 | 7/1971 | Einfall | 446/423 |
| 3,785,651 | 1/1974 | Smith | 273/153 R |
| 3,789,533 | 2/1974 | Spengler et al. | 446/423 |
| 3,849,930 | 11/1974 | Stubbmann | 446/476 |
| 4,027,626 | 6/1977 | DeSousa | 119/1 |
| 4,109,410 | 8/1977 | Saito | 446/423 |
| 4,139,967 | 2/1979 | Kuna et al. | 446/476 |
| 4,291,488 | 9/1981 | Orenstein | 446/423 |
| 4,359,837 | 11/1982 | Hool | 446/471 |
| 4,677,938 | 7/1987 | Tominaga | 119/29 |
| 4,743,023 | 5/1988 | Collier | 273/153 R |
| 4,824,098 | 4/1989 | Huang | 273/113 |
| 4,953,502 | 9/1990 | Hoover | 119/29 |

Primary Examiner—Paul J. Hirsch

[57] ABSTRACT

An elevator/staircase toy for small animals (hamsters, gerbils, mice, or other small animals) housed in a transparent containment structure and comprising, first, a plurality of vertical walls radiating from a central vertical axis with a rotational sequence of horizontal plates disposed between them and offset vertically in an incremental and progressive manner, with a plurality of apertures disposed in the vertical walls in corresponding relation to the plates, optionally including one-way passage means on the apertures, and providing maximum floor space due to plate offsets and vertical apertures, secure, segmented living space which easily accommodates bedding, mazelike complexity in a compact structure offering directly viewable compartments and positive routing from a first horizontal plate to a designated last horizontal plate accessing an elevator, and second, an animal-operated and automatically resetting elevator embodied in a pair of counterbalanced elevator cars connected by cable suspended over guide pulleys and possessing cushioning means and animal-controlled or weight-sensitive retaining means. There are numerous safety features and food can be dropped directly into each elevator car for motivation. A bell is optional. Elevators lift out with a lid and the staircase disassembles with interlocking surfaces.

9 Claims, 3 Drawing Sheets

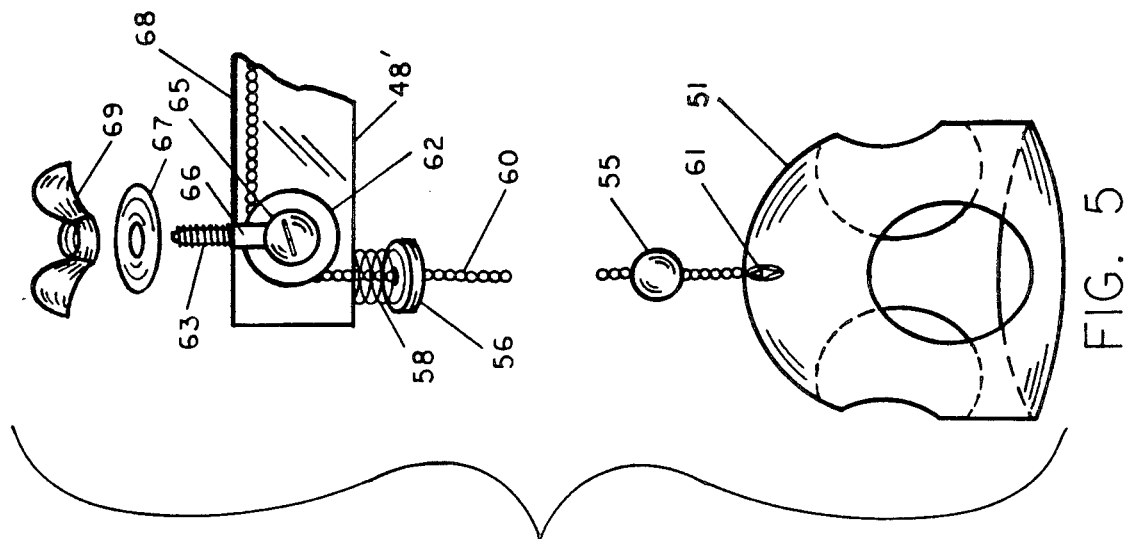
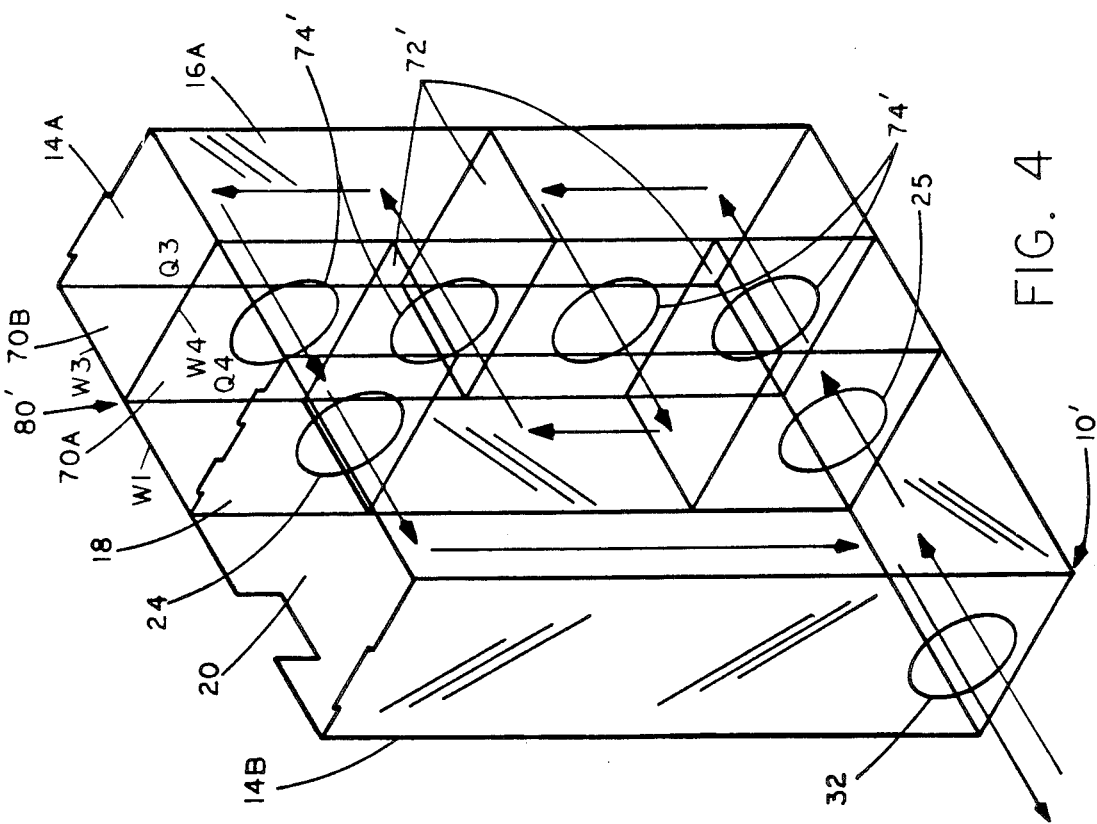

ELEVATOR/STAIRCASE TOY FOR SMALL ANIMALS

CROSS REFERENCE TO RELATED APPLICATION

This application is a continuation-in-part of U.S. application Ser. No. 460,992, filed Jan. 4, 1990, now abandoned, and related to U.S. application Ser. No. 593,075, filed Oct. 5, 1990.

BACKGROUND OF THE INVENTION

1. Field of the Invention

This invention relates to a toy for small animals (hamsters, gerbils, mice or other small animals), and more particularly to an animal-operated and automatically resetting elevator combined with a unique and intricate melding of a staircase with a maze, housed in a transparent containment structure and possessing one-way passage means.

Specifically, the staircase portion of the toy comprises a plurality of vertical walls radiating from a central vertical axis, an alternating or rotational sequence of horizontal plates disposed between the walls, the sequence being offset or misaligned vertically in an incremental and progressive manner, with increments generally being less than the height of a small animal and less than the distance between two vertically aligned horizontal plates, progressive being successively higher, and a plurality of apertures or restricted passageways, with optional cover flaps or one-way passage means, disposed in the vertical walls in corresponding relationship to the horizontal plates.

Ideally, a transparent containment structure houses the assembly and possesses a removable end for convenient access. Also, the toy is accessed at selected levels through the containment structure for cooperative use with the elevator herein disclosed. The staircase would also work with a multi-level cage or other toy requiring upper level access or even in combination with an enlarged chamber.

Thus, a small animal can be positively routed from a first horizontal plate to a designated last horizontal plate in a smooth-flowing staircase-like manner and without the tendency to fall back through horizontal apertures common in multi-level mazes, and can alternately negotiate horizontal plates and vertical apertures which provide both maze-like complexity and secure, segmented living space, so that a sleeping animal would not tumble downward, in a compact hybrid structure which accommodates bedding nicely. Moreover, every compartment or enclosed space above a horizontal plate and between two vertical walls is directly viewable form the exterior and floor space maximized due to the incremental offsets and the vertical apertures.

The staircase portion serves as a novel and entertaining means to guide a small animal to the elevator, which is animal-operated and reset or automatically reset, with cushioning means and animal-operated or weight-sensitive retaining means. The elevator is further embodied in a pair of counterbalanced elevator cars connected by cable over guide pulleys, their operation being free of any shearing action during animal exit.

2. Description of the Prior Art

The observation of small animal behavior inevitably leads to the conclusion that there is considerable potential for entertainment, limited only by the pet toys available, for these animals are game for almost anything they can learn or "fall into." Patience is essential with complex toys, but the payoff is bigger.

The conception of the elevator was a desire to provide the small animal with a toy that does something to him when he isn't doing anything to it—an unexpected but stimulating, enjoyable, and ultimately controllable movement. Not just exercise, but entertainment—like having a car instead of a bicycle.

As is well known, counterbalanced dumbwaiters have been used to move cargo from one floor of a structure to another, both as hand-operated and motorized units. Elevators have also been used for toys. In U.S. Pat. No. 4,291,488, Orenstein's elevator is operated by a toy "animal" moving a lever and releasing the elevator car; however, the elevator must be reset manually.

Several other patented toy elevators operate on means other than passenger control and gravity, employing instead battery power, clockwork spring movement, and manual or cranking means. These include U.S. Pat. No. 4,359,837 to Hool, U.S. Pat. No. 3,849,930 to Stubbmann, U.S. Pat. No. 4,109,410 to Saito, U.S. Pat. No. 3,789,538 to Spengler, and U.S. Pat. No. 3,593,454 to Einfalt. None of the above could be operated solely by an animal and automatically reset.

Counterbalanced elevators and dumbwaiters are well known, e.g., U.S. Pat. No. 1,231,075 to Seeberger. However, the counterbalance itself is usually a compact weight and not a second compartment.

In U.S. Pat. No. 2,908,498, Becraft employs a counterbalanced double-seated device as a child's playroom ride, but the operation of the ride is largely non-analogous to the present invention. The playroom ride is intended for use by two passengers rather than one, both simultaneously and continuously. Normally, the elevator is used by one small animal which enters, is transported, and then exits. In the playroom rid, not only does gravity act on the passengers' weight, but each passenger must exert leg pressure to complete a cycle. One animal operates the elevator, with gravity alone acting on its weight, and this same force resets the elevator. In addition, the playroom ride is probably entered and exited simultaneously with each seat in mid-position, so an automatic half-cycle reset whereby an empty elevator car is located in the "up" or ready position is a different problem. Finally, the shearing action upon leaving the child's rid is managed by the passengers without shear control means, rather than being inherently solved by the automatic resetting of the invention.

It is submitted than the application of an elevator for use in a toy for small animals promises to be more entertaining to a young or not-so-young person than something which must be manipulated by hand because of the displacement of control onto the animal and the unpredictable behavior of the animal.

Moreover, the toy is designed to operate safely, and the mechanical parts involved, i.e. ball chain, springs, magnets, and pulleys are minimal in number and all standard parts, which serves to keep the cost down.

There was also a need to get the animal to the top of the elevator, and hopefully offer additional novelty, rather than just leaving the task to a tube, ladder, or other compatible device, although this is a viable alternative. A accomplishes the task, and doubles as additional living space, or multi-level apartment.

Staircases are ubiquitous; and, there are many variations in dimensions, construction, and modes of ascent.

The staircase disclosed is particularly adapted for use in a small animal toy because the steps are large enough to rest on for extended periods of time, the structure includes apertures or restricted passageways to form segmented enclosures which add maze-like complexity which would only be used by animals, the structure is preferably transparent, and lastly, the structure is designed for disassembly and cleaning.

Many toys already exist for small animals, including tubes, ladders, slides, wheels, and ordinary miniature steps. The present invention offers a more novel exercise means and can be used inside or outside of a cage either separately or in combination with other structures including slides, tubes, ladders, or especially a small pet elevator.

A switchback or spiral staircase-like arrangement of partially or totally enclosed living compartments or stations with connecting apertures is versatile in application, while being transparent for maximum viewing and disassembled in a variety of ways for easy cleaning. Food, treats, and bedding may be added, and the small animal may choose to rest in such a structure for extended periods of time. Mazes are defined to be puzzling, confusing, intricate networks of pathways, providing many choices, and implying randomness. A maze use ten times would probably result in ten different routes being taken. The arbitrary limitation or selection of apertures might result in particular patterns of routes, but the supporting structure would not automatically possess the subtle and precise arrangement of surfaces with sequential and incremental offsets producing a complex yet smooth-flowing design, or the vertical apertures for accommodating both vertical and horizontal displacement, disclosed in the present application.

Three-dimensional mazes, e.g. Huang, U.S. Pat. No. 4,824,098, Hoover, U.S. Pat. No. 4,953,502, Hall, U.S. Pat. No. 2,261,804, and Collier, U.S. Pat. No. 4,743,023, quite often tend to have base structures, tops, or monolithic levels which completely separate compartments on different horizontal planes, and perfect alignment of cubicles or compartments on a level and between levels, forming rows and columns of equal-sized spaces. These types of mazes are easy to conceptualize and construct. Huang is perfectly regular in structure, including apertures, the irregularity existing in the random and arbitrary blockage of apertures with dumbbells. In Hall, Hoover, and Collier, interior surfaces are aligned on three axes, with less regular apertures.

Some maze structures preserve monolithic horizontal levels of compartments but with less regularity of compartmentalization on each level. A good example is Smith, U.S. Pat. No. 3,785,651, in which there are multiple horizontal segregations, and randomness on each level. Meyer, in U.S. Pat. No. 3,516,589 retains discrete levels, even though introducing angled alleys and ramps, with unequal size compartments. So, too, do Jones in U.S. Pat. No. 3,260,236 and Miler in U.S. Pat. No. 3,857,364 define space randomly on a level, but preserve the monolithic base.

Alternately, Tominaga, in U.S. Pat. No. 4,677,938, discloses a kind of wrap-around structure with a plurality of connected vertical plates, however, his horizontal plate members are not disposed between the plates with corresponding vertical apertures, thereby losing some complexity and secure compartmentalization. Although the viewability provided by Tominaga is excellent, his structure would not naturally lend itself to accommodating bedding or for positive routing in combination with another toy, such as the elevator.

Treer, in U.S. Pat. No. 4,822,047 discloses a housing with left and right symmetry, regularity and segregation on both vertical planes and horizontal planes, yet random compartmental layout within.

Finally, some maze-type structures are totally random, with no apparent repetition of structure at all, e.g., Salvato, U.S. Pat. No. Des. 265,139.

What is not found in prior art is the superposition of a staircase onto a maze, with subtle and intricate structural adjustments and selection of surfaces with particular, advantageous, corresponding placement of vertical apertures. No simple arbitrary choice of apertures using all statistical possibilities in any prior art maze, no rotation of a maze in space, and no mere choice of spiral or zigzag patterns applied to a typical maze structure would derive the present unique and unobvious melding of a staircase and a maze.

Cover flaps on some of the apertures of the toy add yet another form of amusement and challenge. They may also serve to guide the animal through an aperture in the preferred direction. Doors which allow larger pets to enter and leave an owner's home are well known.

Common gerbil/hamster tubes can become expensive quickly, take up considerable space, be difficult to clean, and may accidentally disconnect. The present invention provides the small animal with more compact complexity and the human observer more cost-effective entertainment in a novel and convenient assembly.

The inventor holds a firm belief that some cages are too small for even one animal, and that any toy learned in 30 seconds isn't enough of a challenge to the animal. It is hoped that the availability of a quality toy will result in the purchase of a larger cage, or even in the decision to purchase a pet in the first place.

SUMMARY OF THE INVENTION

The present invention, generally stated, provides a toy for small animals which gives the animal the opportunity to navigate a complex maze-like staircase structure, utilize compartmentalized living space, operate an elevator, and open a cover flap on an aperture.

It is also an object of this invention to provide a toy which combines compartmentalized living space, complex exercise capability, smooth-flowing controlled passage or positive routing to a designated endpoint, direct viewability into all compartments, and a stimulating experience which may offer a small animal a sense of power and accomplishment.

Accordingly, the primary object of this invention is to provide a toy for small animals that is both challenging and amusing to the small animal and entertaining for the human observer.

It is also an object of this invention to provide a toy which may invite human interaction to motivate the animal by placing treats in strategic locations.

It is also an object of this invention to provide a toy for small animals which is capable of being disassembled to facilitate cleaning.

It is also an object of this invention to provide a toy for small animals which may be used inside or outside of a cage either by itself or in combination with another structure.

It is also an object of this invention to provide a toy for small animals which possesses enduring popularity and a classic design.

These and other objects, features, and advantages of the invention will become apparent from examining the drawings and description hereinafter given.

The preferred embodiment and a number of alternate embodiments are delineated. The novel features that are considered to be characteristic of the invention are set forth with particularity in the appended claims.

BRIEF DESCRIPTION OF THE DRAWINGS

FIG. 4 is an isometric view of a longitudinal half-section of the symmetric toy with the elevator assembly and lid removed. This second alternate embodiment shows another way of controlling access to the elevator cars when used with elevator cars possessing front walls. Arrows show the animal's path, including a zigzag route through the staircase portion.

FIG. 5 shows one side of a symmetric third alternate embodiment which eliminates the containment and staircase structures and includes means for attaching the elevator assembly to the top of a wire cage or vented plastic cage lid.

DETAILED DESCRIPTION OF THE INVENTION

Figure 1:
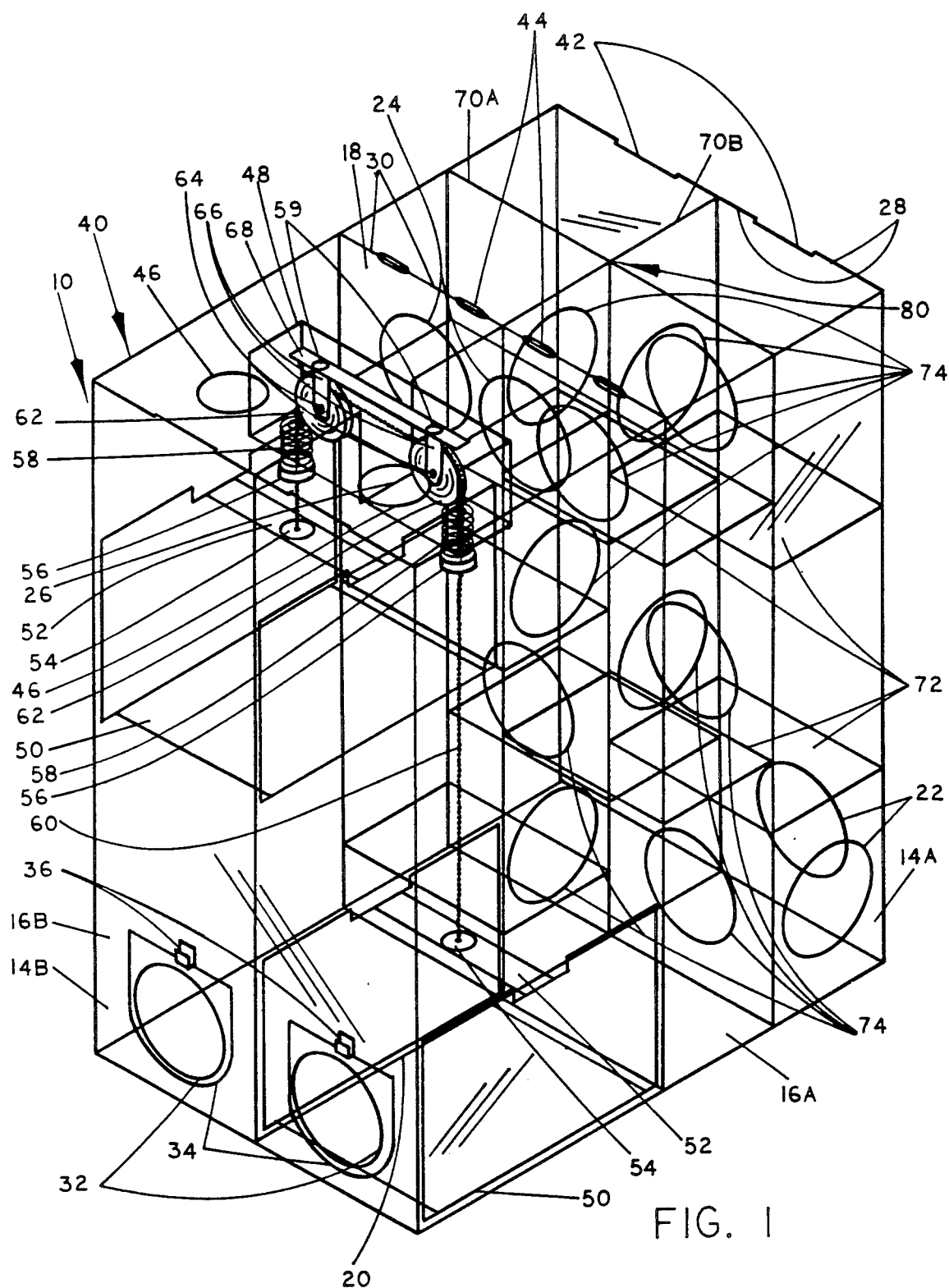
FIG. 1 is an isometric view of the preferred embodiment of the staircase toy shown in combination with a small animal elevator as actually viewed in transparent material. This conveys the puzzle-like quality of the combination toy, with internal elements clarified in subsequent views.

Referring now to the drawings, FIG. 1 illustrates the preferred embodiment of a combination elevator/staircase toy for small animals. The containment structure 10 is essentially a rectangular box which is multicompartmented and open at the top. It is preferably molded from transparent plastic or fabricated from transparent sheet plastic. Alternate embodiments may vary in geometric shape, size, and the choice and number of sides (including top and bottom) left open. With a round containment structure, there could be four vertical walls and sector-shaped horizontal plates, or with a polygonal (pentagonal) containment structure, there could be five vertical walls and triangular-shaped horizontal plates. While one side could be removable, an end is a better choice, and the staircase would simply slide out. Furthermore, the radiating vertical walls would not have to actually intersect, perhaps radiating from an inner containment structure mirroring the contour of the outer containment structure, such as an inner cylinder combined with an outer cylindrical containment structure.

In the preferred embodiment, there are entrance apertures 22 in side wall 16A and in end wall 14A which provide access to the bottom of the staircase compartment adjacent to end wall 14A. Access from two sides of the containment structure 10 allows flexibility in placement of the toy in a cage.

Additionally, there is an internal dividing wall 18 in containment structure 10 between the staircase compartment adjacent to end wall 14A and elevator compartment adjacent to end wall 14B. This dividing wall has apertures 24 which allow passage from the staircase side to the elevator side of the toy. Dividing wall 18 with notch 26 and dividing wall 20 are shown fixed but may be removable. Pulley guard housing 48 is attached to lid 40 which possesses two feeding holes 46.

The upper surfaces of end walls 14A and 14B and dividing wall 18 of containment structure 10 have notches 28 and 30, respectively, which serve to secure the removable lid 40 with notches 42 corresponding to notches 28 and slots 44 corresponding to notches 30. This arrangement is quite adequate for a toy placed in a cage; however, when the toy is to be used as a cage or cage extension, a more secure arrangement would be indicated, such as an overlapping snap fit. The popular bottom tray could also be incorporated into the design.

There are two exit apertures 32 in end wall 14B of containment structure 10. Each aperture 32 possesses a one-way passage means or cover flap 34 attached by a hook-like fastener 36 above each aperture 32. The attachment 36 allows each flap 34 to open easily when pushed from the inside of containment structure 10, as a small animal will instinctively learn to do after descending in an elevator car 50. The contour of each flap 34 is preferably round for safety reasons, and the edges are smooth to discourage a reverse entry, although entertainment is the goal of the toy and not good behavior. Perverse critters that are able to defeat the cover flaps 34 will use the toy often enough in the correct way also.

The toy may connect with well-known tubes or be adapted to placement on top of a cage, possibly with a bottom entrance into the staircase assembly, and possibly with extra compartments leading out of the elevators and joining together for a common connection point. A way of requiring only one external connection would be to have the elevator exits leading back into the staircase structure through the dividing wall 18 instead of out the end wall. Then the toy would connect at only one external staircase entrance. In order to connect with tubes, the apertures would be round with notches, and a version of the well-known connecting ring would fit inside the aperture and over a connecting tube, twisting to be secured. Another type of connection device would have a pushbutton lock-fitting into a perfectly round aperture of the toy.

Figure 2:
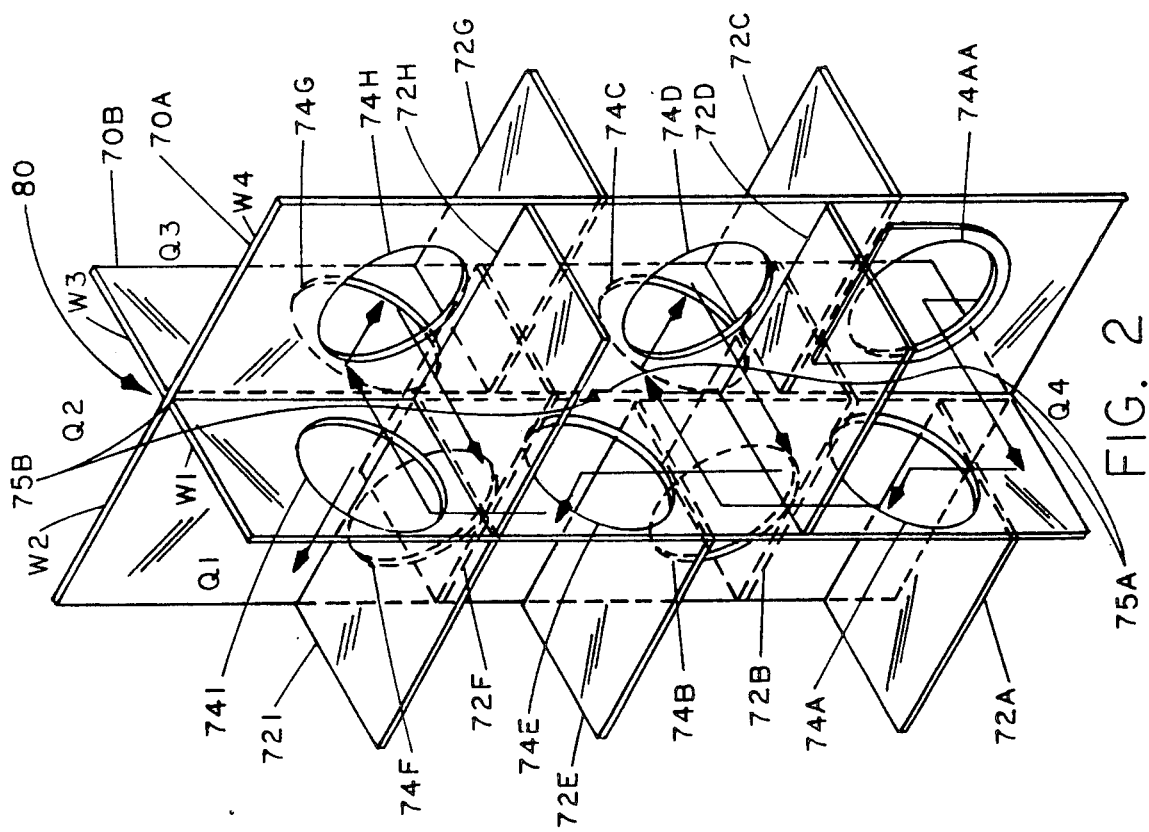
FIG. 2 is an isometric view of the staircase-like arrangement of living compartments removed from the containment structure. Arrows show the ascending spiral route.

FIG. 2 illustrates the staircase structure 80 removed from the containment structure 10 of FIG. 1. It is made of transparent plastic material and either molded or fabricated. In the preferred embodiment, the staircase structure 80 is entirely removable from the containment structure 10 and has two vertical planar surfaces 70A parallel to end walls 14 and 70B parallel to side walls 16, intersecting perpendicularly along a common central vertical axis to form four vertical walls designated by W1, W2, W3, and W4, and quadrants designated by Q1, Q2, Q3, and Q4. The vertical planar surfaces are also shown with interlocking vertical slots 75A and 75B, along the central axis, each slot wide enough to accommodate the material thickness and approximately one-half the height of the vertical planar surfaces, slot 75A located in the lower one-half of 70A, slot 75B located in the upper one-half of 70B. Attached are a series of horizontal plates 72A through 72I, forming an alternating or rotational (the terms meaning "from one to the next adjacent one, each in turn") sequence for Q1 to Q2 to Q3 to Q4, and repeating, while being simultaneously offset in a vertically incremental and progressive manner, i.e., at heights increasing by a measure less than the height of a small animal and less than the distance between two vertically aligned horizontal plates, e.g., plates 72A and 72E. Looking down and proceeding in a clockwise direction from ground level up, at the bottom of and following all apertures 74A-I (except the first aperture 74AA which is at ground level) is a corresponding horizontal plate 72. There are two apertures 74H and 74I and two horizontal plate 72H and 72I at the eighth level; this serves to equalize access to the two elevator cars 50. Smooth-flowing positive routing without multiple maze-like choices directs a small animal from the first horizontal plate 72A to a designated last horizontal plate 72H or 72I.

Various alternate staircase-like arrangements of living compartments or stations could include the following features: horizontal steps attached to the containment structure, steps which snap-fit onto adjacent surfaces and can be re-arranged, apertures in the horizontal surfaces and instead of a spiral arrangement, a switchback, zigzag, or other regular, repeating, non-maze-like arrangement of partially or totally enclosed living compartments or stations at incremental elevations. Cover flaps 34 would work on the staircase compartment apertures 74 as well as they do on the apertures 32 of the containment structure 10. Finally, a containment structure would be advantageous but not absolutely necessary.

In practice, the addition of bedding to the staircase compartments is a nice touch, inviting the animal to spend some quiet time here; therefore, the size of each step should be cozy but not too confining for the size of the animal.

Tracing the path of a small animal through the preferred embodiment of the toy (FIG. 1), he enters the bottom of the staircase structure 80 through one of two apertures 22, and proceeds in a clockwise fashion alternately through an aperture 74 and onto a horizontal plate 72 or compartment designated by 72 and enclosed by vertical surfaces 70A and 70B and containment structure 10, until he reaches the elevator level. Note that he is positively routed and moves vertically through a series of vertical apertures; whereas vertical movement in a maze would probably employ horizontal apertures, through which the small animal would tend to fall back and which would limit the amount of floor space useful for resting. Ideally, he chooses to pass through an aperture 24 in the dividing wall 18 into the "up" elevator car 50 or perhaps he sees the food his owner dropped into this car and approaches it. He steps into elevator car 50 showing crossbar 52 connecting to cable 60 which passes over pulleys 62 with center posts 64 suspended from supports 66 on each end of bar 68 attached by rivets 59 to lid 40. Metallic components 54 retain the car by magnetic attraction to ring magnets 56, and compression springs 58 cushion the descent of the cars. He may also be free to retrace his route down the staircase 80, or else additional cover flaps 34 placed on any of the staircase apertures 74 may restrict his choices.

Figure 3:
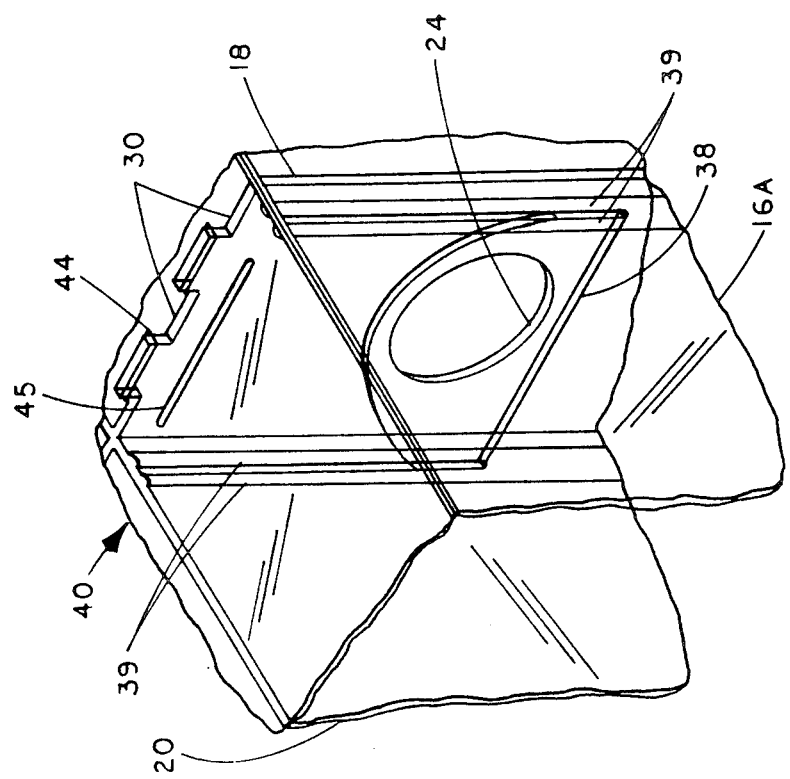
FIG. 3 is an isometric view of a longitudinal half-section of a symmetric combination elevator/staircase toy with room for an elevator car in each front shaft and depicting a zigzag arrangement of living compartments providing novel access to the upper elevator entrance.

FIG. 3 shows a longitudinal half-section of a symmetric embodiment of a combination elevator and staircase toy with a modified containment structure 10'. The entrances 25 to the staircase compartment structure are internal on wall 18 and replace external entrances 22 in FIG. 1. The staircase compartment structure 80 is divided by vertical wall 70B which lacks any apertures 74. Vertical surface 70A possesses four apertures 74' and three horizontal surfaces 72' on each side of 70B, arranged so that, on each separate side of the staircase compartment structure, the animal must travel in a switchback or zigzag path to the top of the staircase compartment structure.

The entire toy is designed to be easily cleaned and maintained through convenient disassembly which itself may be entertaining to a child.

It is to be expressly understood that the present description and preferred embodiment are for illustrative purposes only and are not to be construed as a limitation of the details of construction or design of the invention, but rather are inclusive of other variations and applications which do not depart from the broad interest and intent of the invention. Accordingly, the scope of the invention should be determined by the appended claims.

What is claimed is:

1. A toy for small animals comprising:
   a plurality of vertical walls radiating from a central vertical axis;
   an alternating or rotational sequence of horizontal plates disposed between said vertical walls, said sequence of horizontal plates offset or misaligned vertically in an incremental and progressive manner, with increments generally being less than the height of a small animal and less than the distance between two vertically aligned horizontal plates, progressive being successively higher; and
   a plurality of apertures or restricted passageways disposed in the vertical walls in corresponding relationship to the horizontal plates;
   wherein every compartment or enclosed space above a horizontal plate and between two vertical walls is directly viewable and there exists maximum floor space due to the incremental offsets and the vertical apertures; and whereby a small animal can be positively routed from a first horizontal plate to a designated last horizontal plate in a smooth-flowing manner and without the tendency to fall back through horizontal apertures, and can alternately negotiate horizontal plates and vertical apertures which provide both complexity and secure, segmented living space, in a compact structure which easily accommodates bedding, can be accessed at selected levels, and is ideally suited for use with another toy, such as an elevator.

2. The toy defined in claim 1 further including a transparent containment structure with a removable end for slidably extracting the vertical walls and horizontal plates.

3. The toy defined in claim 1 wherein at least one aperture possesses one-way passage means, thereby enhancing the complexity, the compartmentalization, and the positive routing function of the toy.

4. The toy defined in claim 1 wherein the vertical walls further comprise two vertical planar surfaces perpendicularly disposed to create four quadrants, wherein the sequence of horizontal plates further comprises, alternately or rotationally, at least one repetition of a plate in quadrant one first, a plate in quadrant two second, a plate in quadrant three third, and a plate in quadrant four fourth.

5. The toy defined in claim 4 wherein each vertical planar surface possesses a slot, essentially equal in width to the thickness of the vertical planar surfaces, equal in length to approximately one-half the height of the vertical planar surfaces, said slot in the first vertical planar surface disposed along the upper half of the central vertical axis, said slot in the second vertical planar surface disposed along the lower half of the central vertical axis, so that the two vertical planar surfaces are perpendicularly interlockable to form the vertical walls and quadrants.

6. The toy defined in claim 4 wherein at least one aperture possesses one-way passage means, thereby enhancing the complexity, the compartmentalization, and the positive routing means of the toy.

7. The toy defined in claim 1 wherein the vertical walls further comprise two oppositely disposed vertical walls provided with apertures, two additional oppositely disposed vertical walls perpendicular to first said oppositely disposed walls and lacking apertures, and wherein the alternating or rotational sequence of horizontal plates exists with corresponding vertical apertures on separate sides of said vertical walls lacking apertures, thereby creating separate positive routing means.

8. The toy defined in claim 6 wherein each vertical planar surface possesses a slot, essentially equal in width to the thickness of the vertical surfaces, equal in length to approximately one-half the height of the vertical surfaces, the slot in the first vertical planar surface disposed along the upper half of the central vertical axis, the slot in the second vertical planar surface disposed along the lower half of the central vertical axis, so that the two vertical planar surfaces are perpendicularly interlockable to form the vertical walls and quadrants.

9. The toy defined in claim 7 wherein at least one aperture possesses one-way passage means, thereby enhancing the complexity, the compartmentalization, and the positive routing means of the toy.

* * * * *

UNITED STATES PATENT AND TRADEMARK OFFICE
CERTIFICATE OF CORRECTION

PATENT NO. : 5,095,852

DATED : Mar. 17, 1992

INVENTOR(S) : Judith L. Hoover

It is certified that error appears in the above-identified patent and that said Letters Patent is hereby corrected as shown below:

The title page and columns 1 - 10, should be deleted, and substitute therefor the attached title page and columns 1 - 12.

Signed and Sealed this

Tenth Day of August, 1993

Attest:

MICHAEL K. KIRK

Attesting Officer

Acting Commissioner of Patents and Trademarks

United States Patent [19]

Hoover

[11] Patent Number: 5,095,852
[45] Date of Patent: Mar. 17, 1992

[54] ELEVATOR/STAIRCASE TOY FOR SMALL ANIMALS

[76] Inventor: Judith L. Hoover, 3108 Killian Rd., Uniontown, Ohio 44685

[21] Appl. No.: 682,881

[22] Filed: Apr. 8, 1991

Related U.S. Application Data

[63] Continuation-in-part of Ser. No. 460,992, Jan. 4, 1990, abandoned.

[51] Int. Cl.$^5$ .................. A01K 15/00; A01K 1/00
[52] U.S. Cl. ............................................... 119/29
[58] Field of Search .............. 119/29, 15; 273/113, 273/153 R; 272/6; 446/476, 477, 479, 423

[56] References Cited

U.S. PATENT DOCUMENTS

| | | | |
|---|---|---|---|
| 802,198 | 10/1905 | Corley | 272/6 |
| 1,231,075 | 6/1917 | Seeberger | 272/6 |
| 1,801,724 | 4/1931 | Conklin | 446/476 |
| 2,522,133 | 9/1950 | Sanders | 446/171 |
| 2,908,498 | 10/1959 | Becraft | 272/6 |
| 3,516,389 | 6/1970 | Meyer | 119/29 |
| 3,593,454 | 7/1971 | Einfall | 446/423 |
| 3,785,651 | 1/1974 | Smith | 273/153 R |
| 3,789,533 | 2/1974 | Spengler et al. | 446/423 |
| 3,849,930 | 11/1974 | Stubbmann | 446/476 |
| 4,027,626 | 6/1977 | DeSousa | 119/1 |
| 4,109,410 | 8/1972 | Saito | 446/423 |
| 4,139,967 | 2/1979 | Kuna et al. | 446/476 |
| 4,291,488 | 9/1981 | Orenstein | 446/423 |
| 4,359,837 | 11/1982 | Hool | 446/471 |
| 4,677,938 | 7/1987 | Tominaga | 119/29 |
| 4,743,023 | 5/1988 | Collier | 273/153 R |
| 4,824,098 | 4/1989 | Huang | 273/113 |
| 4,953,502 | 9/1990 | Hoover | 119/29 |

Primary Examiner—Paul J. Hirsch

[57] ABSTRACT

An elevator/staircase toy for small animals (hamsters, gerbils, mice, or other small animals) housed in a transparent containment structure and comprising, first, a plurality of vertical walls radiating from a central vertical axis with a rotational sequence of horizontal plates disposed between them and offset vertically in an incremental and progressive manner, with a plurality of apertures disposed in the vertical walls in corresponding relation to the plates, optionally including one-way passage means on the apertures, and providing maximum floor space due to plate offsets and vertical apertures, secure, segmented living space which easily accommodates bedding, maze-like complexity in a compact structure offering directly viewable compartments and positive routing from a first horizontal plate to a designated last horizontal plate accessing an elevator, and second, an animal-operated and automatically resetting elevator embodied in a pair of counterbalanced elevator cars connected by cable suspended over guide pulleys and possessing cushioning means and animal-controlled or weight-sensitive retaining means. There are numerous safety features and food can be dropped directly into each elevator car for motivation. A bell is optional. Elevators lift out with a lid and the staircase disassembles with interlocking surfaces.

9 Claims, 3 Drawing Sheets

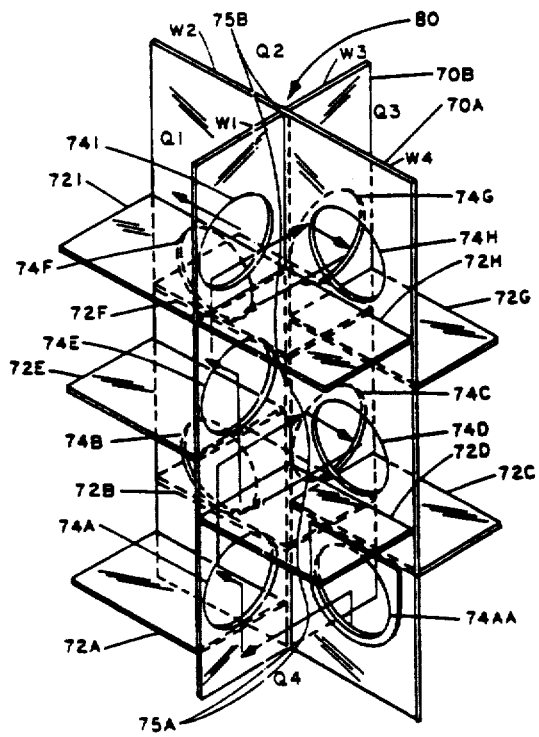

ELEVATOR/STAIRCASE TOY FOR SMALL ANIMALS

CROSS REFERENCE TO RELATED APPLICATION

This application is a continuation-in-part of U.S. application Ser. No. 460,992, filed Jan. 4, 1990, now abandoned, and related to U.S. application Ser. No. 593,075, filed Oct. 5, 1990.

BACKGROUND OF THE INVENTION

1. Field of the Invention

This invention relates to a toy for small animals (hamsters, gerbils, mice or other small animals), and more particularly to an animal-operated and automatically resetting elevator combined with a unique and intricate melding of a staircase with a maze, housed in a transparent containment structure and possessing one-way passage means.

Specifically, the staircase portion of the toy comprises a plurality of vertical walls radiating from a central vertical axis, an alternating or rotational sequence of horizontal plates disposed between the walls, the sequence being offset or misaligned vertically in an incremental and progressive manner, with increments generally being less than the height of a small animal and less than the distance between two vertically aligned horizontal plates, progressive being successively higher, and a plurality of apertures or restricted passageways, with optional cover flaps or one-way passage means, disposed in the vertical walls in corresponding relationship to the horizontal plates.

Ideally, a transparent containment structure houses the assembly and possesses a removable end for convenient access. Also, the toy is accessed at selected levels through the containment structure for cooperative use with the elevator herein disclosed. The staircase would also work with a multi-level cage or other toy requiring upper level access or even in combination with an enlarged chamber.

Thus, a small animal can be positively routed from a first horizontal plate to a designated last horizontal plate in a smooth-flowing staircase-like manner and without the tendency to fall back through horizontal apertures common in multi-level mazes, and can alternately negotiate horizontal plates and vertical apertures which provide both maze-like complexity and secure, segmented living space, so that a sleeping animal would not tumble downward, in a compact hybrid structure which accommodates bedding nicely. Moreover, every compartment or enclosed space above a horizontal plate and between two vertical walls is directly viewable from the exterior and floor space maximized due to the incremental offsets and the vertical apertures.

The staircase portion serves as a novel and entertaining means to guide a small animal to the elevator, which is animal-operated and reset or automatically reset, with cushioning means and animal-operated or weight-sensitive retaining means. The elevator is further embodied in a pair of counterbalanced elevator cars connected by cable over guide pulleys, their operation being free of any shearing action during animal exit.

2. Description of the Prior Art

The observation of small animal behavior inevitably leads to the conclusion that there is considerable potential for entertainment, limited only by the pet toys available, for these animals are game for almost anything they can learn or "fall into." Patience is essential with complex toys, but the payoff is bigger.

What led to the conception of the elevator was a desire to provide the small animal with a toy that does something to him when he isn't doing anything to it—an unexpected but stimulating, enjoyable, and ultimately controllable movement. Not just exercise, but entertainment—like having a car instead of a bicycle.

As is well known, counterbalanced dumbwaiters have been used to move cargo from one floor of a structure to another, both as hand-operated and motorized units. Elevators have also been used for toys. In U.S. Pat. No. 4,291,488, Orenstein's elevator is operated by a toy "animal" moving a lever and releasing the elevator car; however, the elevator must be reset manually.

Several other patented toy elevators operate on means other than passenger control and gravity, employing instead battery power, clockwork spring movement, and manual or cranking means. These include U.S. Pat. No. 4,359,837 to Hool, U.S. Pat. No. 3,849,930 to Stubbmann, U.S. Pat. No. 4,109,410 to Saito, U.S. Pat. No. 3,789,538 to Spengler, and U.S. Pat. No. 3,593,454 to Einfalt. None of the above could be operated solely by an animal and automatically reset.

Counterbalanced elevators and dumbwaiters are well known, e.g., U.S. Pat. No. 1,231,075 to Seeberger. However, the counterbalance itself is usually a compact weight and not a second compartment.

In U.S. Pat. No. 2,908,498, Becraft employs a counterbalanced double-seated device as a child's playroom ride, but the operation of the ride is largely non-analogous to the present invention. The playroom ride is intended for use by two passengers rather than one, both simultaneously and continuously. Normally, the elevator is used by one small animal which enters, is transported, and then exits. In the playroom ride, not only does gravity act on the passengers' weight, but each passenger must exert leg pressure to complete a cycle. One animal operates the elevator, with gravity alone acting on its weight, and this same force resets the elevator. In addition, the playroom ride is probably entered and exited simultaneously with each seat in mid-position, so an automatic half-cycle reset whereby an empty elevator car is located in the "up" or ready position is a different problem. Finally, the shearing action upon leaving the child's ride is managed by the passengers without shear control means, rather than being inherently solved by the automatic resetting of the invention.

It is submitted that the application of an elevator for use in a toy for small animals promises to be more entertaining to a young or not-so-young person than something which must be manipulated by hand because of the displacement of control onto the animal and the unpredictable behavior of the animal.

Moreover, the toy is designed to operate safely, and the mechanical parts involved, i.e. ball chain, springs, magnets, and pulleys are minimal in number and all standard parts, which serves to keep the cost down.

There was also a need to get the animal to the top of the elevator, and hopefully offer additional novelty, rather than just leaving the task to a tube, ladder, or other compatible device, although this is a viable alternative. A circular, spiral, switchback, or zigzag hybrid of a staircase and a maze efficiently and amusingly accomplishes the task and doubles as additional living space, or multi-level apartment.

Staircases are ubiquitous; and, there are many variations in dimensions, construction, and modes of ascent. The staircase disclosed is particularly adapted for use in a small animal toy because the steps are large enough to rest on for extended periods of time, the structure includes apertures or restricted passageways to form segmented enclosures which add maze-like complexity which would only be used by animals, the structure is preferably transparent, and lastly, the structure is designed for disassembly and cleaning.

Many toys already exist for small animals, including tubes, ladders, slides, wheels, and ordinary miniature steps. The present invention offers a more novel exercise means and can be used inside or outside of a cage either separately or in combination with other structures including slides, tubes, ladders, or especially a small pet elevator.

A switchback or spiral staircase-like arrangement of partially or totally enclosed living compartments or stations with connecting apertures is versatile in application, while being transparent for maximum viewing and disassembled in a variety of ways for easy cleaning. Food, treats, and bedding may be added, and the small animal may choose to rest in such a structure for extended periods of time.

Mazes are defined to be puzzling, confusing, intricate networks of pathways, providing many choices, and implying randomness. A maze used ten times would probably result in ten different routes being taken. The arbitrary limitation or selection of apertures might result in particular patterns of routes, but the supporting structure would not automatically possess the subtle and precise arrangement of surfaces with sequential and incremental offsets producing a complex yet smooth-flowing design, or the vertical apertures for accommodating both vertical and horizontal displacement, disclosed in the present application.

Three-dimensional mazes, e.g. Huang, U.S. Pat. No. 4,824,098, Hoover, U.S. Pat. No. 4,953,502, Hall, U.S. Pat. No. 2,261,804, and Collier, U.S. Pat. No. 4,743,023, quite often tend to have base structures, tops, or monolithic levels which completely separate compartments on different horizontal planes, and perfect alignment of cubicles or compartments on a level and between levels, forming rows and columns of equal-sized spaces. These types of mazes are easy to conceptualize and construct. Huang is perfectly regular in structure, including apertures, the irregularity existing in the random and arbitrary blockage of apertures with dumbbells. In Hall, Hoover, and Collier, interior surfaces are aligned on three axes, with less regular apertures.

Some maze structures preserve monolithic horizontal levels of compartments but with less regularity of compartmentalization on each level. A good example is Smith, U.S. Pat. No. 3,785,651, in which there are multiple horizontal segregations, and randomness on each level. Meyer, in U.S. Pat. No. 3,516,389 retains discrete levels, even though introducing angled alleys and ramps, with unequal size compartments. So, too, do Jones in U.S. Pat. No. 3,260,236 and Miler in U.S. Pat. No. 3,857,364 define space randomly on a level, but preserve the monolithic base.

Alternately, Tominaga, in U.S. Pat. No. 4,677,938, discloses a kind of wrap-around structure with a plurality of connected vertical plates, however, his horizontal plate members are not disposed between the plates with corresponding vertical apertures, thereby losing some complexity and secure compartmentalization. Although the viewability provided by Tominaga is excellent, his structure would not naturally lend itself to accommodating bedding or for positive routing in combination with another toy, such as the elevator.

Treer, in U.S. Pat. No. 4,822,047 discloses a housing with left and right symmetry, regularity and segregation on both vertical planes and horizontal planes, yet random compartmental layout within.

Finally, some maze-type structures are totally random, with no apparent repetition of structure at all, e.g., Salvato, U.S. Pat. No. Des. 265,139.

What is not found in prior art is the superposition of a staircase onto a maze, with subtle and intricate structural adjustments and selection of surfaces with particular, advantageous, corresponding placement of vertical apertures. No simple arbitrary choice of apertures using all statistical possibilities in any prior art maze, no rotation of a maze in space, and no mere choice of spiral or zigzag patterns applied to a typical maze structure would derive the present unique and unobvious melding of a staircase and a maze.

Cover flaps on some of the apertures of the toy add yet another form of amusement and challenge. They may also serve to guide the animal through an aperture in the preferred direction. Doors which allow larger pets to enter and leave an owner's home are well known.

Currently-known toys for small animals include the exercise wheel and interconnecting plastic tubes. While the wheel provides the animal with much-needed exercise, it offers little entertainment to the human observer. Common gerbil/hamster tubes can become expensive quickly, take up considerable space, be difficult to clean, and may accidentally disconnect. The present invention provides the small animal with more compact complexity and the human observer more cost-effective entertainment in a novel and convenient assembly.

The inventor holds a firm belief that some cages are too small for even one animal, and that any toy learned in 30 seconds isn't enough of a challenge to the animal. It is hoped that the availability of a quality toy will result in the purchase of a larger cage, or even in the decision to purchase a pet in the first place.

SUMMARY OF THE INVENTION

The present invention, generally stated, provides a toy for small animals which gives the animal the opportunity to navigate a complex maze-like staircase structure, utilize compartmentalized living space, operate an elevator, and open a cover flap on an aperture.

It is also an object of this invention to provide a toy which combines compartmentalized living space, complex exercise capability, smooth-flowing controlled passage or positive routing to a designated endpoint, direct viewability into all compartments, and a stimulating experience which may offer a small animal a sense of power and accomplishment.

Accordingly, the primary object of this invention is to provide a toy for small animals that is both challenging and amusing to the small animal and entertaining for the human observer.

It is also an object of this invention to provide a toy which may invite human interaction to motivate the animal by placing treats in strategic locations.

It is also an object of this invention to provide a toy for small animals which is safe for the animal regardless of how the animal uses it and which requires only common sense on the part of the human observer to ensure that the toy is set up without any obstruction to the elevators and exits.

It is also an object of this invention to provide a toy for small animals which is capable of being disassembled to facilitate cleaning.

It is also an object of this invention to provide a toy for small animals which may be used inside or outside of a cage either by itself or in combination with another structure.

It is also an object of this invention to provide a toy for small animals which may be economically manufactured with a minimum of parts.

It is also an object of this invention to provide a toy for small animals which possesses enduring popularity and a classic design.

These and other objects, features, and advantages of the invention will become apparent from examining the drawings and description hereinafter given.

The preferred embodiment and a number of alternate embodiments are delineated. The novel features that are considered to be characteristic of the invention are set forth with particularity in the appended claims.

BRIEF DESCRIPTION OF THE DRAWINGS

FIG. 1 is an isometric view of the preferred embodiment of the staircase toy shown in combination with a small animal elevator as actually viewed in transparent material. This conveys the puzzle-like quality of the combination toy, with internal elements clarified in subsequent views.

FIG. 2 is an isometric view of the staircase-like arrangement of living compartments removed from the containment structure. Arrows show the ascending spiral route.

FIG. 3 is a removed section of the toy as shown in FIG. 1, with the addition of an elevator-controlled gate on the aperture leading from the staircase to the elevator. This first alternate embodiment would possess such a gate on each of two elevator entrance apertures.

FIG. 4 is an isometric view of a longitudinal half-section of the symmetric toy with the elevator assembly and lid removed. This second alternate embodiment shows another way of controlling access to the elevator cars when used with elevator cars possessing front walls. Arrows show the animal's path, including a zig-zag route through the staircase portion.

FIG. 5 shows one side of a symmetric third alternate embodiment which eliminates the containment and staircase structures and includes means for attaching the elevator assembly to the top of a wire cage or vented plastic cage lid.

DETAILED DESCRIPTION OF THE INVENTION

Referring now to the drawings, FIG. 1 illustrates the preferred embodiment of a combination elevator/staircase toy for small animals. The containment structure 10 is essentially a rectangular box which is multicompartmented and open at the top. It is preferably molded from transparent plastic or fabricated from transparent sheet plastic. Alternate embodiments may vary in geometric shape, size, and the choice and number of sides (including top and bottom) left open. With a round containment structure, there could be four vertical walls and sector-shaped horizontal plates, or with a polygonal (pentagonal) containment structure, there could be five vertical walls and triangular-shaped horizontal plates. While one side could be removable, an end is a better choice, and the staircase would simply slide out. Furthermore, the radiating vertical walls would not have to actually intersect, perhaps radiating from an inner containment structure mirroring the contour of the outer containment structure, such as an inner cylinder combined with an outer cylindrical containment structure.

In the preferred embodiment, there are entrance apertures 22 in side wall 16A and in end wall 14A which provide access to the bottom of the staircase compartment adjacent to end wall 14A. Access from two sides of the containment structure 10 allows flexibility in placement of the toy in a cage.

Additionally, there is an internal dividing wall 18 in containment structure 10 between the staircase compartment adjacent to end wall 14A and elevator compartment adjacent to end wall 14B. This dividing wall has apertures 24 which allow passage from the staircase side to the elevator side of the toy. The elevator compartment is further divided into two equal shafts by wall 20 between dividing wall 18 and end wall 14B. This wall 20 is a safety feature which prevents the animal from being exposed to the shearing action which occurs during the operation of the elevator, should the animal not be entirely within an elevator car 50. Also, dividing wall 20 helps guide and control the cars. A notch 26 at the top of dividing wall 20 is only as large as necessary to receive the pulley housing 48 attached to the removable lid 40. These dividing walls 18 and 20 are shown fixed but may be removable.

The upper surfaces of end walls 14A and 14B and dividing wall 18 of containment structure 10 have notches 28 and 30, respectively, which serve to secure the removable lid 40 with notches 42 corresponding to notches 28 and slots 44 corresponding to notches 30. This arrangement is quite adequate for a toy placed in a cage; however, when the toy is to be used as a cage or cage extension, a more secure arrangement would be indicated, such as an overlapping snap fit. The popular bottom tray could also be incorporated into the design.

There are two exit apertures 32 in end wall 14B of containment structure 10. Each aperture 32 possesses a one-way passage means or cover flap 34 attached by a hook-like fastener 36 above each aperture 32. The attachment 36 allows each flap 34 to open easily when pushed from the inside of containment structure 10, as a small animal will instinctively learn to do after descending in an elevator car 50. The contour of each flap 34 is preferably round for safety reasons, and the edges are smooth to discourage a reverse entry, although entertainment is the goal of the toy and not good behavior. Perverse critters that are able to defeat the cover flaps 34 will use the toy often enough in the correct way also.

The lid 40 also possesses two apertures 46, one over each elevator car 50, preferably near the exit end of the cars 50. These apertures 46 are too small for animal passage, but large enough for the dual purpose of grasping the lid and dropping treats into the elevator cars 50. The lid 40 also serves as an ideal location for affixing the elevator assembly.

It is important to note that various embodiments permit the use of this invention as a pet toy, or a cage extension.

When used as a cage, the elevator/staircase assemblies would occupy only a portion of the entire containment structure, leaving the animal room for food, water, etc. Any apertures would be connected to other housing or secured.

When used as a cage extension, the toy would connect with well-known tubes or be adapted to placement on top of a cage, possibly with a bottom entrance into the staircase assembly, and possibly with extra compartments leading out of the elevators and joining together for a common connection point. A way of requiring only one external connection would be to have the elevator exits leading back into the staircase structure through the dividing wall 18 instead of out the end wall. Then the toy would connect at only one external staircase entrance. In order to connect with tubes, the apertures would be round with notches, and a version of the well-known connecting ring would fit inside the aperture and over a connecting tube, twisting to be secured. Another type of connection device would have a push-button lock-fitting into a perfectly round aperture of the toy.

FIG. 2 illustrates the staircase structure 80 removed from the containment structure 10 of FIG. 1. It is made of transparent plastic material and either molded or fabricated. In the preferred embodiment, the staircase structure 80 is entirely removable from the containment structure 10 and has two vertical planar surfaces 70A parallel to end walls 14 and 70B parallel to side walls 16, intersecting perpendicularly along a common central vertical axis to form four vertical walls designated by W1, W2, W3, and W4, and quadrants designated by Q1, Q2, Q3, and Q4. The vertical planar surfaces are also shown with interlocking vertical slots 75A and 75B, along the central axis, each slot wide enough to accommodate the material thickness and approximately one-half the height of the vertical planar surfaces, slot 75A located in the lower one-half of 70A, slot 75B located in the upper one-half of 70B. Attached are a series of horizontal plates 72A through 72I, forming an alternating or rotational (the terms meaning "from one to the next adjacent one, each in turn") sequence from Q1 to Q2 to Q3 to Q4, and repeating, while being simultaneously offset in a vertically incremental and progressive manner, i.e., at heights increasing by a measure less than the height of a small animal and less than the distance between two vertically aligned horizontal plates, e.g., plates 72A and 72E. Looking down and proceeding in a clockwise direction from ground level up, at the bottom of and following all apertures 74A–I (except the first aperture 74AA which is at ground level) is a corresponding horizontal plate 72. There are two apertures 74H and 74I and two horizontal plate 72H and 72I at the eighth level; this serves to equalize access to the two elevator cars 50. Smooth-flowing positive routing without multiple maze-like choices directs a small animal from the first horizontal plate 72A to a designated last horizontal plate 72H or 72I.

Various alternate staircase embodiments could include the following features: horizontal steps attached to the containment structure, steps which snap-fit onto adjacent surfaces and can be re-arranged, or other than rectangular-shaped steps. Cover flaps 34 would work on the staircase compartment apertures 74 as well as they do on the apertures 32 of the containment structure 10. Finally, a containment structure would be advantageous but not absolutely necessary.

In practice, the addition of bedding to the staircase compartments is a nice touch, inviting the animal to spend some quiet time here; therefore, the size of each step should be cozy but not too confining for the size of the animal.

Referring again to FIG. 1, the preferred embodiment of the elevator portion of the toy employs two counter-balanced elevator cars 50, also made of transparent plastic, but possibly having opaque floors to eliminate confusion and assure the animal. The reciprocating design accomplishes (a) safe operation—the cars 50 remain stationary as the weight of the animal is removed upon exiting, thus preventing injury to the animal's tail or legs, and (b) automatic resetting of the cars 50 in one-half cycle—one car 50 is always in the "up" or ready position.

In the preferred embodiment of FIG. 1, the elevator cars 50 themselves have additional safety features: the floors are slightly shorter than the sides to prevent the pinching of tails and legs. In addition, the downward transport in car 50 would release rather than catch any body parts. The open-top crossbars 52 of the cars prevent the animal from getting trapped. In the event the animal chooses to jump into a car 50 in the "down" or non-ready position, he can complete the route through the toy. The height of the elevator shaft should not be such that it poses a danger to the animal. If the animal were in a car 50 which had foreign material stopping it part way down, he would usually be able to reach the upper entrance 24 and leave. Otherwise he would merely be confined in an area which should not be uncomfortably small, and he would not be harmed. In practice, even the use of bedding inside the elevator cars 50 has not caused this problem. However, a responsible pet owner should regularly check his pet under any circumstances.

The outer dimensions of the elevator cars 50 are just slightly less than the corresponding width and length of the elevator shafts. This close match stabilizes the movement of the cars 50 and minimizes friction.

Each elevator car 50 is attached to the end of a cable 60, the ideal choice being ball chain, since it is inexpensive, comes in several dimensions and finishes, and is chew-proof. The cable 60 travels over two pulleys 62 affixed by posts 64 to supports 66 which are in turn attached to a bar 68 which has rivets 59 anchoring the entire assembly to the lid.

The elevator cars 50 are suspended from the cable 60 so that they hang freely in their respective elevator shafts.

If the commonly available diameter and finish of the chain 60 are properly matched to the groove diameter and friction characteristics of the pulleys 62, the rate of descent will require no more sophisticated means of control and will work well for a range of sizes of small animals. The pulleys 62 themselves may be fixed or free to rotate. Different sizes of ball chain could be interchangeable, if necessary, being detached from end clasps or sleeves (refer to FIG. 5) and slipped through holes in the crossbars 52 of the elevator cars 50. Alternately, more control could be derived from the use of a sprocket and speed controls well known in the art of pulleys. However, this should not be necessary for the commonest sizes of hamsters, gerbils, and mice found in pet shops. Smaller animals will move more slowly, and larger animals will move more quickly; movement should not be violent. It should be noted in connection with the descent of the elevator cars, that when two or more animals are using the toy simultaneously, one may be able to enter an elevator exit and be subject to his cagemate riding down on him in an elevator car. Small animals can do wondrous things and are known for squeezing into tight places. Unlike shearing action, with healthy adults this should be of no concern in a proper design. However, very young animals should not be mixed with very large animals, and that message should be conveyed to the user.

The pulleys 62 are enclosed in a guard housing 48 attached to the lid 40. The side away from the apertures 24 is open and the underside possesses holes large enough for the cable 60 to pass through. Simultaneously, this is a convenient location for attachement of (a) a cushioning means, namely the compression springs and (b) part of a retaining means, namely nontoxic or coated ceramic ring magnets 56. The magnets 56 come into contact with corresponding metallic components 54, either washers or magnets on the crossbars 52. In some embodiments the magnetic holding force might be adjusted by removing the lower metallic component 54 entirely for a very small animal, by adding plastic or paper spacers, or by laterally moving a split component equivalent to component 54 away from the cable so that less surface contact is made.

It is important to note that both the retaining action and the cushioning action of the elevator assembly are critical features, affecting the acceptance and enjoyment of the toy by the animal.

As shown, the cable 60 travels around the pulleys 62, passes through holes in the guard housing 48, down through the compression springs 58, and finally through the ring magnets 56, dropping vertically to attach at the midpoint of crossbars 52 of each elevator car 50, around which points exist metallic components 54. This arrangement produces perfect centering of all the forces acting on the elevator car 50.

Alternate embodiments include (a) the use of a simpler grooved surface to guide the cable instead of pulleys 62, (b) the use of a flat or leaf spring in place of compression springs 58 or simply flexible material used as crossbars 52 of cars 50 or elsewhere to cushion the stopping action of the cars 50, and (c) a mechanical lever catch or merely flexible tabs rather than magnetic retainers 56 and components 54 for retaining the cars 50 in fixed positions.

Additionally, the animal could be required to operate a lever to release the elevator car. This lever could be a tab extending from a thin plastic disk which normally rests on the lower magnetic component 54 and separates the upper and lower magnetic components 56 and 54 just slightly. This tab-disk structure is also movably anchored to the crossbar 52 of the elevator car. The magnetic attraction would be sufficient to hold the elevator car 50 up until the animal moves the tab and exerts a prying force between the magnetic components 56 and 54 to release them. This arrangement is workable, but the elevator is already animal operated without it, his weight performing the work, and the act of entering an elevator car will change from being accidental behavior to deliberate behavior on the part of the animal.

Tracing the path of a small animal through the preferred embodiment of the toy (FIG. 1), he enters the bottom of the staircase structure 80 through one of two apertures 22, and proceeds in a clockwise fashion alternately through an aperture 74 and onto a horizontal plate 72 or compartment designated by 72 and enclosed by vertical surfaces 70A and 70B and containment structure 10, until he reaches the elevator level. Note that he is positively routed and moves vertically through a series of vertical apertures, whereas vertical movement in a maze would probably employ horizontal apertures, through which the small animal would tend to fall back and which would limit the amount of floor space useful for resting. Ideally, he chooses to pass through an aperture 24 in the dividing wall 18 into the "up" elevator car 50 or perhaps he sees the food his owner dropped into this car and approaches it. As he tentatively places his front paws into the car, the holding action of the magnets provides him with firm footing until he commits four feet and all of his weight to the entry. This releases the car and the animal rides gently down, very slowly for a small animal, and slightly faster for a larger animal, to the bottom of the shaft. Just before the car reaches bottom, the reciprocating car moving upward makes magnetic contact and engages the compression spring. This provides the animal with a soft landing and fixes the cars in their respective position, so that, now, having had one stimulating experience, the animal is immediately faced with another one: how to negotiate a cover flap. It usually takes one try. The entire process may be immediately repeated, or some feature of the toy will become very popular. With seven animals, learning time has ranged from 45 minutes for wild baby mice to an unusual 10 hours for a pet shop gerbil with no toy experience, but with an immediate, perfect repetition in the 10-hour case.

FIG. 3 shows an alternate embodiment not recommended and not really necessary, with gating of the apertures 24 on dividing wall 18, so that a car 50 in the "up" position would lift up a lightweight sliding gate 38 movably attached to the containment structure by traveling up and down between guide grooves 39 in dividing wall 20 and side walls 16A and 16B, with an escape slot 45 through the lid. The gate would remain open only as long as a car were available, and would necessarily leave a gap even when closed to prevent pinching toes and clipping tails. Any type of gate is not recommended, however, because a gerbil's tail is a very delicate body structure and even friction could do damage. Any automatic action must also be safe for two animals using the toy simultaneously. Closure of any type—horizontal over the elevator car or vertical at the aperture, sliding, swinging, rotating, revolving, or always closed but only unlatched by a car in the upper position—is strongly not recommended here (1) because it is not really necessary for the success of the toy, (2) because there is a strong tendency for the animal to try to go where he can't, and the gate can be counterproductive, (3) for safety reasons if it does not work perfectly, and (4) because other embodiments could limit access to only the upper car if this is considered an issue of importance. In the simpler design of the preferred embodiment, the animal will use the elevator properly enough of the time, and jumping down to the lower car is just another amusing activity. Nevertheless another embodiment limiting elevator access follows.

Referring now to FIG. 4, another embodiment shows a different method of restricting access to only the "up" elevator car. This arragement is used in conjunction with elevator cars which have closed ends facing wall 18. The entrances 25 to the staircase are internal on wall 18 and replace external entrances 22 in FIG. 1. The staircase compartment structure 80' is divided by vertical planar surface 70B which lacks any apertures 74. Vertical surface 70A possesses four apertures 74' and three horizontal plates 72' on each side of 70B, arranged so that, on each separate side is a staircase wherein the animal must travel in a switchback or zigzag path to the top of the staircase. Moving forward in his passage route, he uses each step and each aperture once and only once to reach a designated upper location. Thus, the "down" elevator car blocks the very route which leads to its own upper entrance, and the "up" elevator car allows passage to its upper entrance. The "up" elevator comes to rest at a low enough position so that its end wall does not block aperture 24. Apertures 32 are shown without cover flaps 34 so that the animal may enter easily and proceed to aperture 25.

In another embodiment of this small animal toy shown in FIG. 5, the elevator assembly would be attached to the top of a wire cage or vented plastic lid by means of two bolts 63 projecting out of the cage and secured by washers 67 and wing nuts 69. The ends of the pulley guard housing 48' are open. No containment structure is used and the elevator cars 51 are accessible from any side and spaced a safe distance apart. An elevator car guide means may or may not be desirable, depending on the elevator car design. The upper and lower stopping points of the cars can be adjusted to match existing cage levels by clipping the detachable ball chain 60 and re-inserting it through a tiny hole in the car, adding any of the commonly available sleeves 61 for ball chain to determine the length of the chain and the lower stopping point, then by adding a combination metallic component/car stop 55 such as a hollow ball available from ball chain manufacturers to the ball chain above each car, which will not pass through the magnets 56 and which will determine the upper stopping point.

It might be desirable to add a bell to the elevator assembly, which would alert an owner that his pet is using the elevator. As shown in FIG. 5, small jingle bells 65 rotate on the posts 64 of pulleys 62. They could also be placed so that they are agitated by the cable 60 or irregular edge of a pulley 62. Or the rising elevator car 50 could strike a lever which in turn strikes a bell.

The entire toy is designed to be easily cleaned and maintained through convenient disassembly which itself may be entertaining to a child.

It is to be expressly understood that the present description and preferred embodiment are for illustrative purposes only and are not to be construed as a limitation of the details of construction or design of the invention, but rather are inclusive of other variations and applications which do not depart from the broad interest and intent of the invention. Acordingly, the scope of the invention should be determined by the appended claims.

What is claimed is:

1. A toy for small animals comprising:
   a plurality of vertical walls radiating from a central vertical axis;
   an alternating or rotational sequence of horizontal plates disposed between said vertical walls, said sequence of horizontal plates offset or misaligned vertically in an incremental and progressive manner, with increments generally being less than the height of a small animal and less than the distance between two vertically aligned horizontal plates, progressive being successively higher; and
   a plurality of apertures or restricted passageways disposed in the vertical walls in corresponding relationship to the horizontal plates;
   wherein every compartment or enclosed space above a horizontal plate and between two vertical walls is directly viewable and there exists maximum floor space due to the incremental offsets and the vertical apertures; and whereby a small animal can be positively routed from a first horizontal plate to a designated last horizontal plate in a smooth-flowing manner and without the tendency to fall back through horizontal apertures, and can alternately negotiate horizontal plates and vertical apertures which provide both complexity and secure, segmented living space, in a compact structure which easily accommodates bedding, can be accessed at selected levels, and is ideally suited for use with another toy, such as an elevator.

2. The toy defined in claim 1 further including a transparent containment structure with a removable end for slidably extracting the vertical walls and horizontal plates.

3. The toy defined in claim 1 wherein at least one aperture possesses one-way passage means, thereby enhancing the complexity, the compartmentalization, and the positive routing function of the toy.

4. The toy defined in claim 1 wherein the vertical walls further comprise two vertical planar surfaces perpendicularly disposed to create four quadrants, wherein the sequence of horizontal plates further comprises, alternately or rotationally, at least one repetition of a plate in quadrant one first, a plate in quadrant two second, a plate in quadrant three third, and a plate in quadrant four fourth.

5. The toy defined in claim 4 wherein each vertical planar surface possesses a slot, essentially equal in width to the thickness of the vertical planar surfaces, equal in length to approximately one-half the height of the vertical planar surfaces, said slot in the first vertical planar surface disposed along the upper half of the central vertical axis, said slot in the second vertical planar surface disposed along the lower half of the central vertical axis, so that the two vertical planar surfaces are perpendicularly interlockable to form the vertical walls and quadrants.

6. The toy defined in claim 4 wherein at least one aperture possesses one-way passage means, thereby enhancing the complexity, the compartmentalization, and the positive routing means of the toy.

7. The toy defined in claim 1 wherein the vertical walls further comprise two oppositely disposed vertical walls provided with apertures, two additional oppositely disposed vertical walls perpendicular to first said oppositely disposed walls and lacking apertures, and wherein the alternating or rotational sequence of horizontal plates exists with corresponding vertical apertures on separate sides of said vertical walls lacking apertures, thereby creating separate positive routing means.

8. The toy defined in claim 6 wherein each vertical planar surface possesses a slot, essentially equal in width to the thickness of the vertical surfaces, equal in length to approximately one-half the height of the vertical surfaces, the slot in the first vertical planar surface disposed along the upper half of the central vertical axis, the slot in the second vertical planar surface disposed along the lower half of the central vertical axis, so that the two vertical planar surfaces are perpendicularly interlockable to form the vertical walls and quadrants.

9. The toy defined in claim 7 wherein at least one aperture possesses one-way passage means, thereby enhancing the complexity, the compartmentalization, and the positive routing means of the toy.

* * * * *